United States Patent

Prasad et al.

[11] Patent Number: 5,837,125
[45] Date of Patent: *Nov. 17, 1998

[54] REACTIVE PURGE FOR SOLID ELECTROLYTE MEMBRANE GAS SEPARATION

[75] Inventors: Ravi Prasad, East Amherst; Christian Friedrich Gottzmann, Clarence; Nitin Ramesh Keskar, Grand Island, all of N.Y.

[73] Assignee: Praxair Technology, Inc., Danbury, Conn.

[*] Notice: The term of this patent shall not extend beyond the expiration date of Pat. No. 5,733,435.

[21] Appl. No.: 567,699

[22] Filed: Dec. 5, 1995

[51] Int. Cl.$^6$ .................................................. B01D 53/22
[52] U.S. Cl. .................... 205/763; 205/764; 205/765; 95/45; 95/54
[58] Field of Search .................... 204/421–429; 205/763, 764, 765; 95/45, 54; 96/4

[56] References Cited

U.S. PATENT DOCUMENTS

| | | | |
|---|---|---|---|
| 4,167,457 | 9/1979 | Giner | 205/764 |
| 5,035,726 | 7/1991 | Chen et al. | 55/16 |
| 5,118,395 | 6/1992 | Chen et al. | 205/765 |
| 5,160,713 | 11/1992 | Mazanec et al. | 423/210 |
| 5,205,842 | 4/1993 | Prasad | 55/16 |
| 5,306,411 | 4/1994 | Mazanec et al. | 204/265 |
| 5,447,555 | 9/1995 | Yee et al. | 95/54 |
| 5,454,923 | 10/1995 | Nachlas et al. | 205/765 |
| 5,562,754 | 10/1996 | Kang et al. | 95/54 |
| 5,565,017 | 10/1996 | Kang et al. | 95/14 |
| 5,599,383 | 2/1997 | Dyer et al. | 96/8 |

OTHER PUBLICATIONS

Mazanec, T. J., "Electropox: BP's Novel Oxidation Technology", The Activation of Dioxygen and Homogeneous Catalytic Oxidation, pp. 85–96 (1993).

Primary Examiner—Arun S. Phasge
Attorney, Agent, or Firm—Douglas E. Denninger

[57] ABSTRACT

A system and process for producing a high-purity product from a feed stream containing elemental oxygen by applying the feed stream to at least one separator including a feed zone and a permeate zone separated by a solid electrolyte membrane, and driving a portion of oxygen contained in the feed stream from the feed zone to the permeate zone via the membrane by applying to the permeate zone a reactive purge stream containing a reactive gas which combines with oxygen to establish a lower partial pressure of oxygen in that zone. Oxygen-depleted retentate is withdrawn as a high-purity product stream.

20 Claims, 5 Drawing Sheets

REACTIVE PURGE FOR SOLID ELECTROLYTE MEMBRANE GAS SEPARATION

FIELD OF THE INVENTION

This invention relates to apparatus and procedures for separating oxygen from a mixed gas feed stream and, more particularly, to employing a reactive purge stream with a solid electrolyte membrane for removing oxygen to purify the feed stream.

BACKGROUND OF THE INVENTION

Solid electrolyte membranes are made from inorganic oxides, typified by calcium or yttrium-stabilized zirconium and analogous oxides having a fluorite or perovskite structure. At elevated temperatures, these materials contain mobile oxygen-ion vacancies. When an electric field is applied across such an oxide membrane, the membrane will transport oxygen ions and only oxygen ions and thus act as a membrane with an infinite selectivity for oxygen. Such membranes are attractive for use in air separation processes. More recently, materials have been reported that exhibit both ionic and electronic conductivity. A membrane exhibiting such a mixed conduction characteristic can transport oxygen when subjected to a differential partial pressure of oxygen, without the need for an applied electric field or external electrodes.

In an oxygen ion conducting inorganic oxide, oxygen transport occurs due to a presence of oxygen vacancies in the oxide. For materials that exhibit only ionic conductivity, electrodes must be applied to opposed surfaces of the oxide membrane and the electronic current is carried by an external circuit Electrons must be supplied (and removed at the other side of an oxide membrane) to make the reaction proceed.

For mixed conductor materials that exhibit both ionic and electronic conductivity, the countercurrent to the flow of oxygen vacancies is an internal flow of electrons, rather than by an electrical current through an external circuit. The entire transport is driven by oxygen partial pressures in the streams adjacent opposite sides of a mixed conduction inorganic oxide membrane. In the absence of a purge stream, the "permeate" stream that carries the oxygen away from the membrane is "pure" oxygen, and both the feed and the retentate streams must be at a high pressure (or the "permeate" stream at a very low pressure) to create a driving force for the oxygen transport While such an unpurged membrane is attractive for the removal of larger quantities of oxygen from inert gas streams, the oxygen recovery is limited by pressures that can be applied. Even then, the degree of purification that can be obtained is limited.

In the patent art, there are a number of teachings regarding the use of solid electrolyte inorganic oxide membranes. Chen et al. in U.S. Pat. No. 5,035,726 describe the use of solid electrolyte membrane systems for removing oxygen from crude argon feed streams. Chen et al. employ an electrically-driven ionic conductor to achieve gas separation. Chen et al. also mention the possibility of using mixed conductor membranes operated by maintaining an oxygen pressure on the feed side. Chen et al. further teach that oxygen exiting from the permeate side of an electrically-driven ionic membrane may either be removed as a pure oxygen stream or mixed with a suitable "sweep" gas such as nitrogen.

Mazanec et al. in U.S. Pat. No. 5,160,713 describe oxygen separation processes employing a bismuth-containing mixed metal oxide membrane. Mazanec et al. state generally that the separated oxygen can be collected for recovery or reacted with an oxygen-consuming substance. The oxygen-depleted retentate apparently is discarded.

In U.S. Pat. No. 5,306,411, Mazanec et al. disclose a number of uses of a solid electrolyte membrane in an electrochemical reactor. It is mentioned that nitrous oxides and sulfur oxides in flue or exhaust gases can be converted into nitrogen gas and elemental sulfur, respectively. It is also mentioned that a reactant gas such as light hydrocarbon gas can be mixed with an inert diluent gas which does not interfere with the desired reaction, although the reason for providing such a mixture is not stated. The Mazanec patents do not disclose processes to produce a high-purity product from an oxygen-containing stream.

The above-identified patent and technical literature do not disclose means for reducing pressure, membrane area, electrical power, or compressor power to levels required for practical application of solid electrolyte membranes to the separation and purification of product gases by controlled permeation of oxygen.

OBJECTS OF THE INVENTION

It is therefore an object of this invention to provide an improved system for producing a high-purity retentate stream employing at least one oxygen-ion-conducting solid electrolyte membrane and a reactive purge to decrease the concentration of oxygen on the permeate side of the membrane and thereby increase the driving potential for oxygen ion transport across the membrane.

It is another object of this invention to provide such a system wherein pressure or power requirements are reduced from those exhibited by the prior art.

A still further object of this invention to provide such a system which enables reduced membrane area or reduced purge flow rates.

SUMMARY OF THE INVENTION

This invention comprises a process for producing a high-purity product from a feed stream containing elemental oxygen by applying the feed stream to at least one separator including a first feed zone and a first permeate zone separated by a solid electrolyte membrane capable of transporting oxygen ions, driving a first portion of oxygen contained in the feed stream from the feed zone to the permeate zone through the membrane by applying a reactive purge stream to the permeate zone to remove oxygen therefrom and establish a lower partial pressure of oxygen in the permeate zone, and withdrawing oxygen-depleted retentate as a product stream after oxygen has been removed from the feed zone.

In a preferred embodiment, the separator described above is positioned as a second stage and the feed stream is initially directed to a second feed zone of a second separator, the second separator being positioned as a first stage and having a second permeate zone separated from the second feed zone by a second solid electrolyte membrane. Preferably, one or both stages are also purged with at least one type of a diluent stream. More preferably, at least a portion of output of the first permeate zone is directed to mix with the reactive purge stream.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

The term "high-purity" refers to a product stream which contains less than five percent by volume of elemental oxygen. Preferably the product is at least 99.0% pure, more preferably 99.9% pure, and most preferably at least 99.99% pure, where "pure" indicates an absence of elemental oxygen.

DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
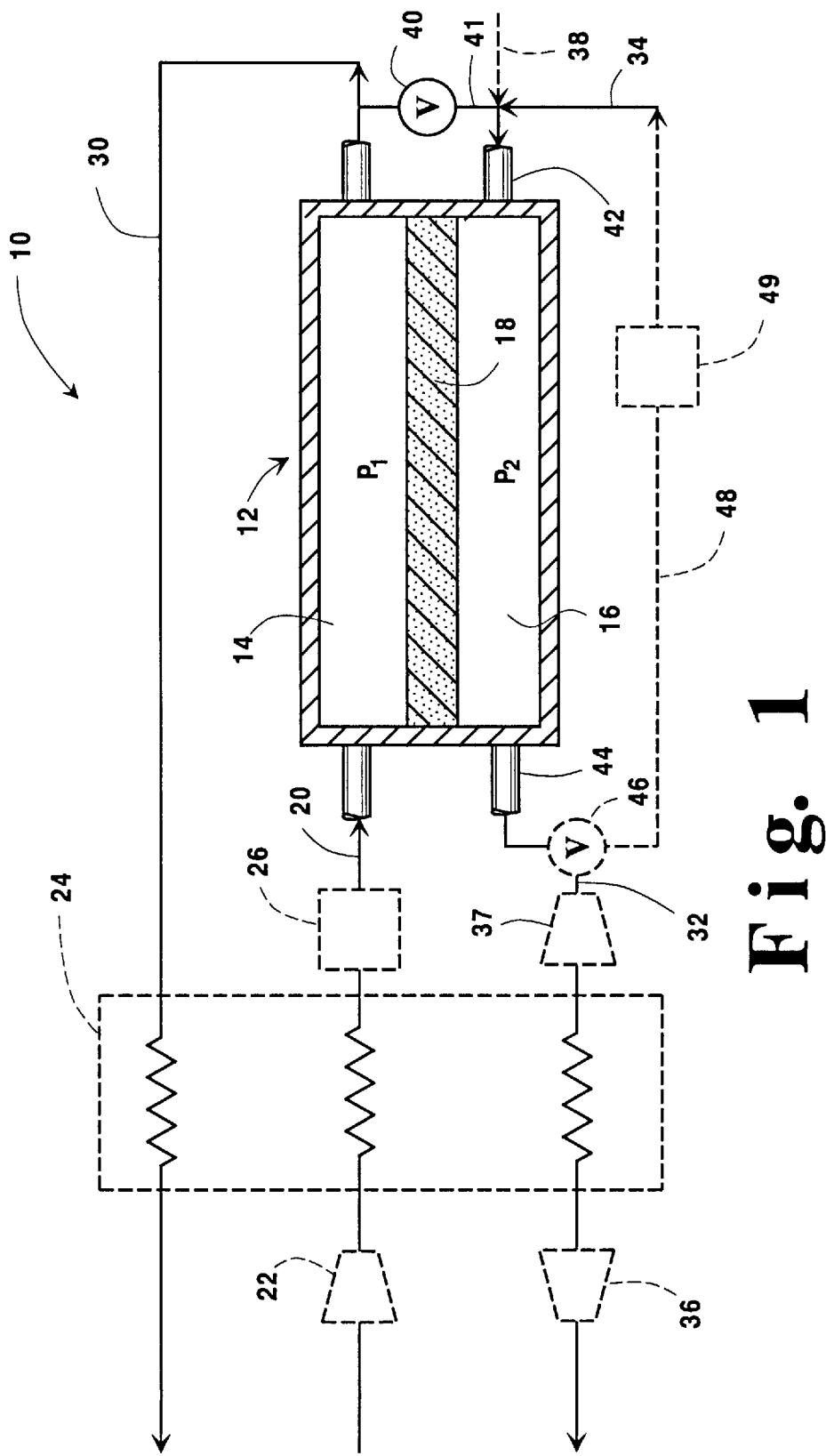
FIG. 1 is a schematic showing of a novel single stage system which employs a reactive purge stream to establish a more substantial oxygen partial pressure ratio across a solid electrolyte oxide membrane.

Purification system 10 according to this invention, FIG. 1, includes a four-port separator 12 having a first feed zone 14 and a first permeate zone 16 separated by a solid electrolyte oxygen-ion conducting membrane 18. An oxygen-containing feed stream 20 is applied to the first feed zone 14. The feed stream 20 optionally is compressed by compressor 22, warmed by heat exchanger 24, and/or preheated by trim heater 26, shown in phantom.

Oxygen ions are transported across membrane 18 when the oxygen partial pressure $P_1$ in feed zone 14 is greater than the oxygen partial pressure $P_2$ in permeate zone 16. Oxygen-depleted product stream 30 is obtained from feed zone 14 and a permeate stream 32 is obtained from permeate zone 16.

Heat from streams 30,32 optionally is transferred to feed stream 20 through heat exchanger 24. It is desirable to recover the heat using a heat exchanger to warm the feed stream prior to contacting the first electrolyte membrane.

Vacuum pump 36, shown in phantom, optionally assists withdrawal of permeate stream 32 from permeate zone 16. Typically, the permeate must be cooled to below 100° C., preferably below 50° C., before it reaches a vacuum pump.

Alternatively, the hot gas permeate stream 32 is expanded through an expander 37, shown in phantom, to produce power, and then passed through heat exchanger 24 for heat recovery. In this case, total pressure in the permeate zone 16 is greater than atmospheric pressure.

A reactive gas purge stream 34 is applied to permeate zone 16 in counter-current flow to feed stream 20 in this construction. Counter-current flow of the purge stream is more desireable than co-current flow when not all of the oxygen is removed by reaction in the permeate zone 16. However, co-current or cross-flow arrangements may also be used.

Reactive gas utilized according to the present invention preferably comprises any gas that is capable of reacting in stoichiometric or superstoichiometric (fuel-rich) conditions with elemental oxygen or oxygen ions to yield an equilibrium oxygen partial pressure, at the operating conditions of the separator, of less than $10^{-4}$ atmosphere. Reactive purge stream 34 includes a reactive gas such as natural gas, $H_2$, CO, $CH_4$, $CH_3OH$, or other gas that reacts or otherwise combines with oxygen to decrease the quantity of elemental oxygen in permeate zone 16 to lower oxygen partial pressure $P_2$. The term "gas" refers to substances which are in gaseous or vapor form at the operating temperature of the oxygen separation system.

Oxygen separation procedures employing SELIC membranes generally require that the feed stream (and the temperature of the membrane) be at an elevated level, e.g. 400° C. to 1200° C., preferably 500° C. to 1000° C., for efficient transport of oxygen ions across the membranes. The term "SELIC" refers to solid electrolyte ionic, mixed, or dual-phase conductors that can transport oxide ions. Separation procedures according to the present invention typically utilize a reactive gas which combines with oxygen in an exothermic reaction.

More heat may be generated in a combustion reaction than would be desireable for proper operation of the SELIC membrane The reaction is controlled in one construction by blending an oxygen-depleted diluent component stream 38 shown in phantom. Suitable diluent components include argon, nitrogen, steam, and carbon dioxide.

The diluent is selected to control temperature rise by increasing the heat capacity of the combined stream 42, to slow the rate of reaction within permeate zone 16 by reducing the temperature or concentration of reactants, and/or to make conditions within permeate zone 16 less reducing Permeate zone 16 is a reaction zone according to the present invention, and rendering the gases less reducing increases the chemical stability of the membrane 18.

In this construction, separator operation is further enhanced by diverting a portion 41 of product stream 30 through valve 40 to purge permeate zone 16. The diluent effects described above can be achieved by the product purge if the product stream is sufficiently oxygen-depleted. In one construction stream 38 and/or stream 41 comprise ten to ninety-five percent of blended stream 42. The actual percentage is selected based on the relative costs of diluent and reactive gas, the oxygen reactivity of the reactive gas, the maximum temperature desired in the reactor, the desired heat release of the reaction, and the types and thicknesses of the SELIC membrane.

In another construction, a portion of output from permeate zone 16 is directed through valve 46 as exhaust recirculation stream 48, both shown in phantom, to mix with reactive purge stream 34 prior to applying stream 34 into permeate zone 16. Several important benefits may be achieved by recirculating the exhaust gas as shown in phantom. Water vapor or carbon dioxide in the exhaust stream 48 can diminish or suppress coke (carbon) formation and deposition which otherwise might foul the surface of SELIC membrane 18 and diminish its performance. In the absence of species such as water and carbon dioxide, coking is likely when high-temperature, hydrocarbon fuel-rich conditions occur. These conditions are especially likely near purge inlet 42 because reactive purge stream 34 initially is fuel-rich at inlet 42 and becomes fuel-depleted only as it approaches outlet 44.

Another benefit of recirculating the exhaust gas stream when the fuel is incompletely combusted is that hydrogen, carbon monoxide, hydrocarbons, or other combustibles are recycled for more complete combustion to improve fuel efficiency and to reduce undesired emissions. Recirculating hydrogen, which is particularly reactive, will produce improved performance especially near purge inlet 42. Exhaust recirculation stream 48 also reduces the need for an external diluent 38 or for product purge 41.

Additionally, recirculation stream 48 can be used to regulate temperatures within separator 12 by either adding heat to the stream 48 or rejecting heat from the stream 48, such as by using heat exchanger device 49, prior to mixing with reactive purge stream 34. Otherwise, a heat exchanger or other external heating mechanism may be needed for reactive purge stream 34. Exhaust recirculation therefore can improve stability, control, and overall operation of a purification system according to the present invention.

Figure 2:
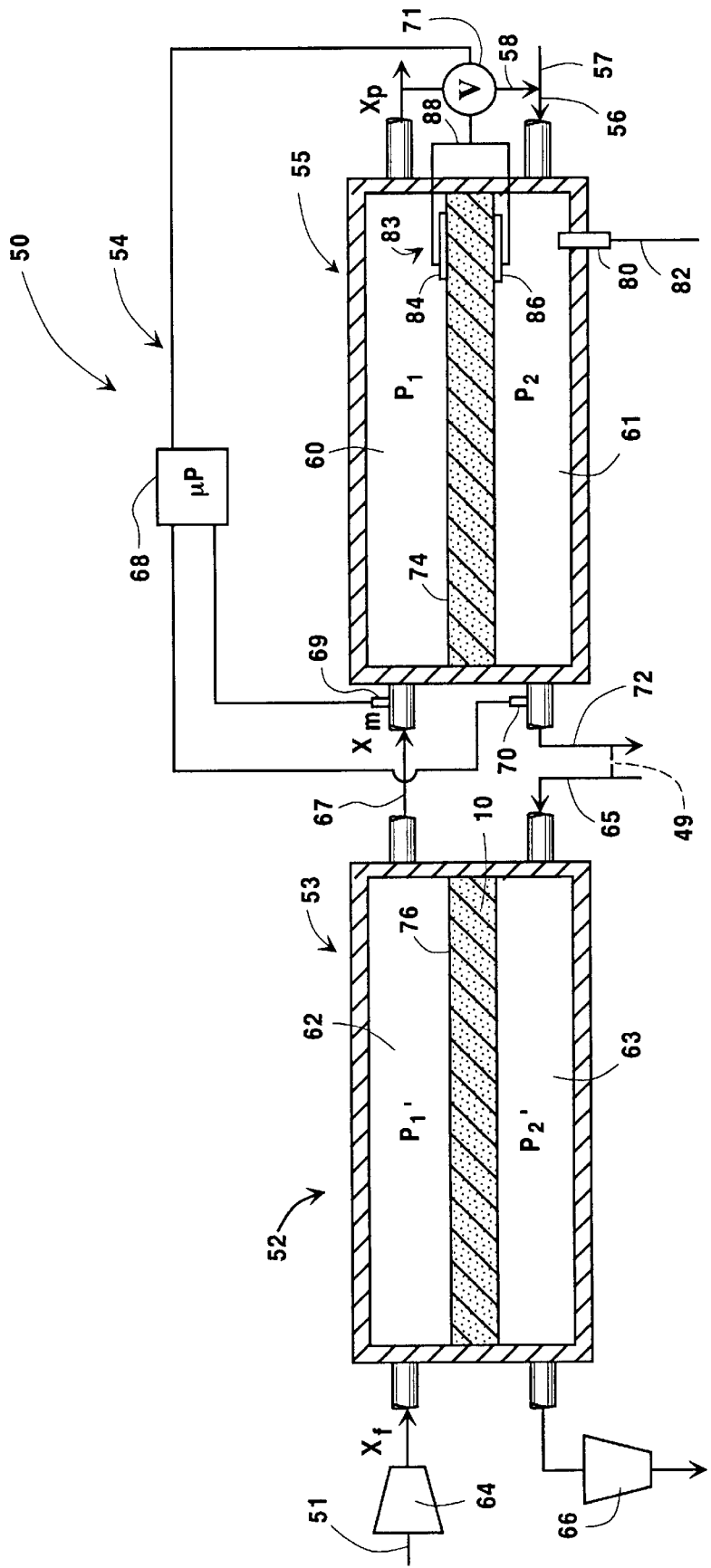
FIG. 2 is a schematic showing of a two-stage system according to the present invention.

Purification system 50, FIG. 2, includes a first stage 52 having a second separator 53 and a second stage 54 having a first separator 55. Second stage 54 utilizes a reactive purge stream 56 which is a selected blend of reactive gas stream 57 and product purge stream 58. Alternatively, an external diluent can be substituted for product purge stream 58. The operation of first separator 55 therefore would be similar to that of first separator 12, FIG. 1, if separator 12 were positioned as a second stage.

The ratio in oxygen partial pressures $P_1$ and $P_2$ of first feed zone 60, FIG. 2, and first permeate zone 61, respectively, is enhanced by the reaction of oxygen in permeate zone 61. Second separator 53, however, relies on a relatively high oxygen feed mole fraction $X_f$ in initial feed stream 51 and on a sufficient ratio in oxygen partial pressures $P_1'$ and $P_2'$ of second feed zone 62 and second permeate zone 63 to achieve oxygen transport through membrane 76. The difference in oxygen partial pressures is established by compressor 64 which generates a high feed pressure, by oxygen-deficient purge stream 65, and/or by vacuum pump 66.

The intermediate retentate stream 67 from second separator 53 is directed to the first feed zone 60. Second stage 54 includes a microprocessor 68 in this construction which is electrically connected to sensors 69, 70 and to valve 71. Microprocessor 68 optimizes operation of first separator 55 based on the flow rate and/or the mid-stage mole fraction $X_m$ of elemental oxygen of stream 67, as detected by inlet sensor 69, and the temperature of first permeate zone 61, as detected by exit sensor 70. In another construction, sensor 70 is positioned in permeate reaction zone 61 instead of in exit stream 72. Changes in the sensed variables cause microprocessor 68 to adjust valve 71 to alter the amount of diluent product stream 58 which mixes with reactive gas stream 57, thereby changing the mixing ratio of reactive stream 56.

In yet another construction, microprocessor 68 adjusts the flow rate of reactive gas stream 57 using a low-temperature valve (not shown). The low-temperature adjustable valve is much less expensive than the high-temperature valve 71, which in this construction can be replaced with an inexpensive fixed orifice to serve as a fixed valve 71.

Some or all of exhaust stream 72 may be provided as stream 49, shown in phantom in FIG. 2, to combine with or to serve entirely as purge stream 65. Some reactions may occur in second permeate zone 63, especially if exhaust stream 72 contains unburned fuel.

Fuel is initially ignited in permeate zone 61 in one construction by ignitor 80. Electrical energy is delivered along line 82 to generate a spark in permeate zone 61. Initial combustion may be started by reaction of fuel 57 with purge stream 58; use of product purge to start combustion is especially appropriate for stream 56 when intermediate feed stream 67 is air.

Alternatively, initial external heat, such as from trim heater 26, FIG. 1, preheats the compressed feed streams 51 and/or 67, FIG. 2, and the membrane 74 to cause autoignition of the fuel 57. Autoignition of a hydrocarbon fuel such as methane depends on factors including its concentration and the concentration of elemental oxygen. Further, many SELIC membrane materials are catalytic, which may initiate and promote the combustion process and lower the autoignition temperature. Alternatively, an oxidation catalyst is introduced as granules or as a surface coating to promote oxidation reactions. Both heterogeneous surface reactions and homogeneous gas reactions may occur to consume oxygen The SELIC membrane may be prepared from a variety of materials including those listed in a related application disclosing two or more stages of solid electrolyte ionic and/or mixed conducting membranes, entitled "Pressure Driven Solid Electrolyte Membrane Gas Separation Method", U.S. Ser. No. 08/444,354, filed on May 18, 1995 now abandoned, which is incorporated herein by reference. Also incorporated herein by reference for their teachings are U.S. Pat. Nos. 5,160,713 and 5,306,411 of Mazanec et al. The SELIC membrane may include a non-SELIC structural support element, such as a porous metal or ceramic tube.

For ease of construction and improved performance, it is preferred that both SELIC membranes 74 and 76 are mixed conducting membranes. When SELIC membrane 74 is a pure ionic conductor membrane, as shown in FIG. 2 for illustration purposes, an external electrical circuit 83 is provided including cathode 84, anode 86, and connecting wire 88 to complete the circuit and thereby provide an electrical connection across the SELIC membrane. Oxygen ions are driven across SELIC membrane 74 by the oxygen chemical potential gradient to produce an EMF (electromotive force) that drives current in circuit 83. Alternatively, an external EMF such as a power supply is additionally applied to enhance oxygen ion movement Pressure driven processes are attractive for situations where large quantities of oxygen are to be permeated through a mixed conduction oxide membrane. In principle, the pressure driven process can also be used for removal of trace oxygen from the feed stream. This requires the oxygen partial pressure on the permeate side to be reduced to a level below that in the product stream. In practice, this can be accomplished by compressing the feed stream to a very high pressure, applying a very low vacuum level to the permeate, using a purge gas stream with a sufficiently low oxygen concentration, and/or using a reactive purge according to the present invention.

The use of very high feed pressures or very low permeate pressures are power and capital intensive. Hence, non-purged pressure-driven processes tend to be economically unattractive for the removal of oxygen to achieve a very low concentration in the product. By contrast, the large currents required by conventional electrically driven processes make them too energy intensive to be attractive for the removal of large oxygen quantities.

A multiple stage system according to the present invention is preferred to enable use of different types of SELIC membranes, different grades of reactive gas and/or purge gas, or different combinations of negative pressure and purge. Each stage may contain one or more SELIC membranes in feed series or feed parallel arrangement; the stages are in feed series arrangement.

In multiple stage systems according to this invention, pure ionic SELIC membranes can be placed in different arrangements with mixed conductor membranes, preferably having an ionic membrane downstream of a mixed conductor membrane. This arrangement optimizes the ability of the preceding mixed conductor membrane to remove large amounts of oxygen from an oxygen-rich feed stream by a pressure-driven process, and the ability of the successive ionic membrane with electrodes and external circuitry to extract oxygen from a low-oxygen feed stream by the reactively purged process.

Without a purge gas that has very low oxygen partial pressure, mixed conductors are not as suitable for extracting oxygen down to very low oxygen partial pressures. Ionic conductors with electrodes and external circuitry in inert purge configurations are inefficient and require large amounts of membrane area, making them very capital intensive if used to remove large amounts of oxygen. Ionic conductors in reactive purge configurations require much less area but would consume significant amounts of fuel and generate high temperatures if used to remove high concentrations of oxygen.

Different types of SELIC membranes utilized for multiple stage systems according to this invention include membranes formed advantageously of different ionic or mixed conductor materials. In one construction, for example, a first stage membrane includes a mixed conductor perovskite which exhibits high oxygen ion conductivity but is unstable at very low oxygen partial pressures. The second stage must be comprised of a material which is characterized by high stability at very low oxygen partial pressure, even though such a material typically has a lower oxygen ion conductivity than that of the first stage SELIC membrane. Examples of mixed conducting materials of this type are disclosed in U.S. Pat. No. 5,306,411 (Mazanec et al.). Materials used in the second stage must typically be stable at oxygen partial pressures of below $10^{-10}$ atm, which would typically be present in some areas of the permeate zone during reaction.

Alternatively, a material such as yttria-stabilized zirconia "YSZ" ($ZrO_2$ with 8% by weight of $Y_2O_3$), which exhibits a much lower oxygen ion conductivity but is stable at low oxygen partial pressures, is used in the second stage. In this case, the second stage would be reaction purged and would have an external electrical circuit.

One or more SELIC materials can be combined together in a single membrane, such as one of the multiphase mixtures disclosed in U.S. Pat. No. 5,306,411 (Mazanec et al.), to tailor that membrane for the requirements of a particular stage. Further, different mechanical configuration can be used, such as a cross-flow geometry in the first stage, or in an ionic-only second stage, in which permeate is withdrawn at right-angles to feed and retentate flows.

Figure 3:
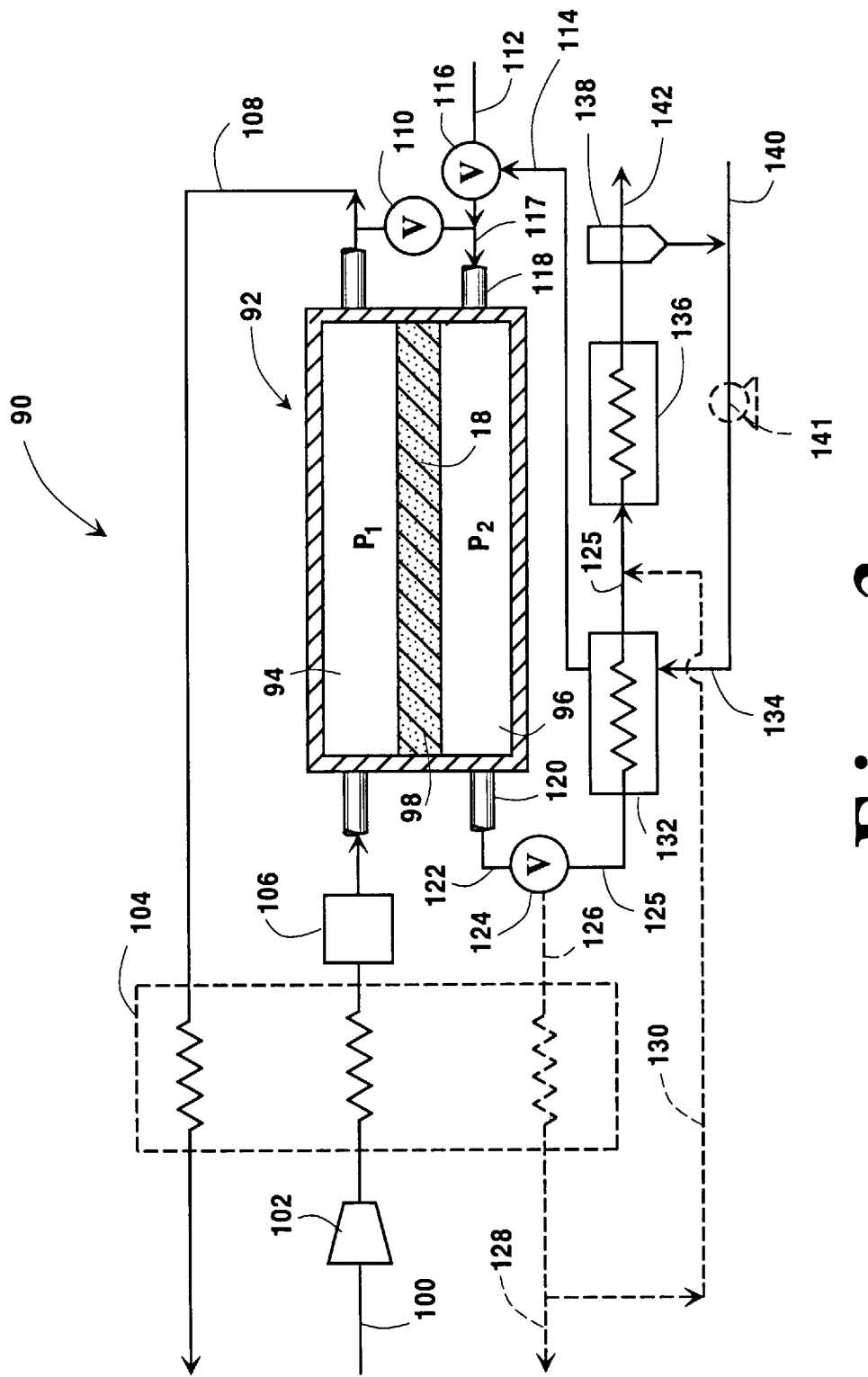
FIG. 3 is a schematic showing of another embodiment of a single stage system according to the present invention which mixes steam with a reactive gas.

Oxygen separation system 90, FIG. 3, includes a separator 92 having a feed zone 94, a permeate zone 96, and a SELIC membrane 98. A feed stream 100 is compressed by compressor 102, heated by heat exchanger 104, and heated as needed by trim heater 106 before delivery to feed zone 94. A portion of oxygen-depleted product stream 108 optionally is diverted through valve 110 to be mixed with reactive purge stream 112.

A diluent stream 114 consisting primarily of steam is mixed with reactive purge stream 112 at valve 116. The actual composition of the blended reactive purge stream 117 entering permeate zone 96 therefore can be adjusted by passing selected amounts of product purge through valve 110 and diluent steam through valve 116. The amounts of steam and product diluents are adjustable to control temperature, improve membrane separation or process stability, and enhance performance.

Preferably, as shown in phantom, some heat contained in exit stream 122 is transferred to feed stream 100 by directing some or all of the exhaust through valve 124 to obtain side stream 126 which, after passing through heat exchanger 104 to warm feed stream 100, is returned as stream 130 to rejoin stream 125 between boiler 132 and condenser 136.

If oxygen is desired as a co-product, the purge gas composition is controlled such that the amount of oxygen near inlet port 118 will be low while the amount of oxygen near exit port 120 will be high. A portion of stream 126 can then be diverted to provide a low-purity oxygen product stream 128.

Boiler 132 transfers heat from stream 125 to water 134, thereby generating steam 114. Alternatively, a steam stream 114 is supplied from an external source. In this construction, stream 125 is further cooled in condenser 136 and water vapor is extracted in water separation chamber 138 to supply water stream 134; make-up water 140 is added as needed. Stream 125 thereby becomes water-depleted stream 142. Preferably, water obtained from separator 138 is conventionally treated to remove carbon dioxide or other undesirable species to reduce corrosion in the boiler system. A pump 141, shown in phantom, may be added to pressurize stream 134.

If the amount of combustion in permeate zone 96 is small, that is, only a small portion of oxygen is removed by reaction, then stream 142 can serve as an oxygen product stream. If combustion is near stoichiometric or is superstoichiometric (fuel-rich), then stream 142 can yield carbon dioxide, carbon monoxide, and/or hydrogen as products, for example. In another construction, stream 125 is directed elsewhere or discarded without extracting water vapor.

Figure 4:
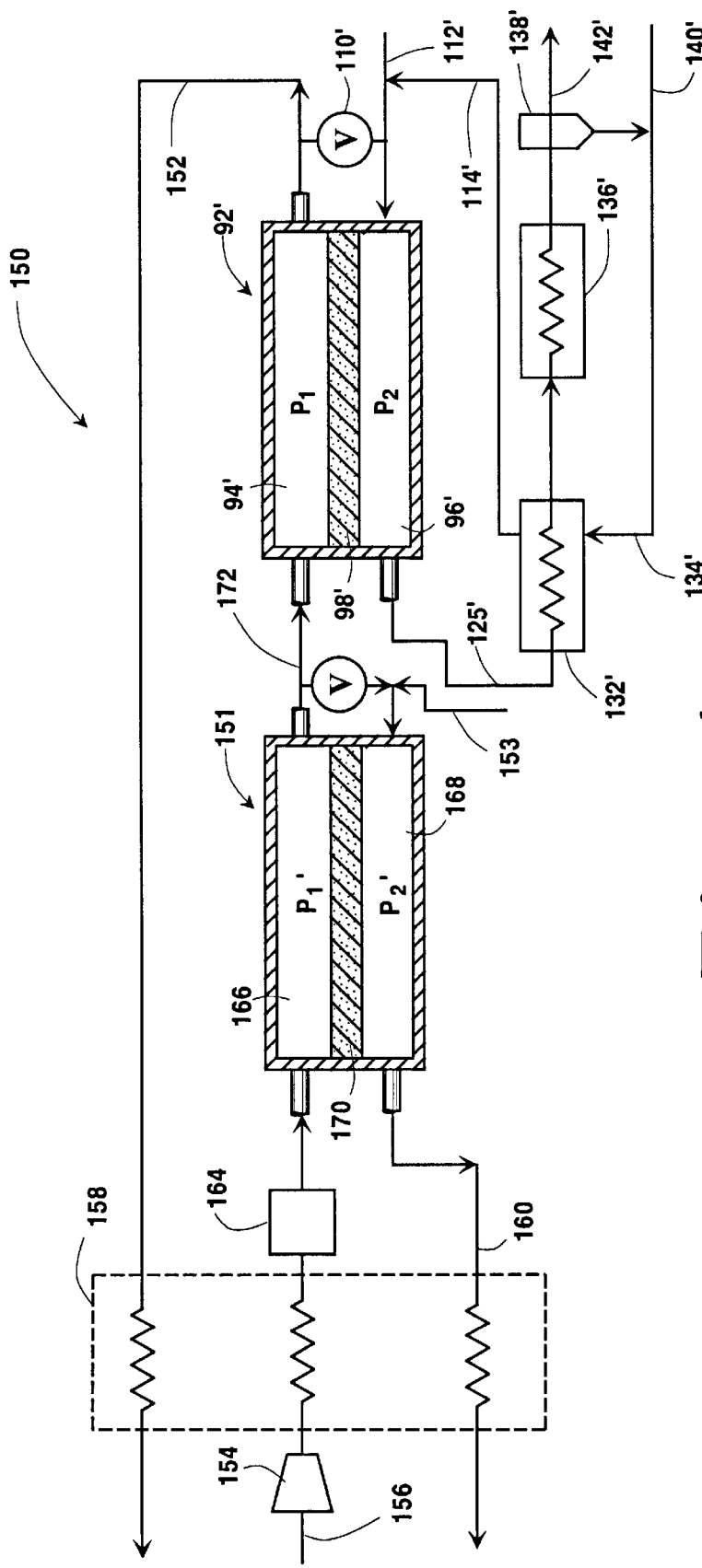
FIG. 4 is a schematic showing of a dual stage, pressure-driven process configured in accordance with the invention.

System 150, FIG. 4, is suitable for bulk production of a low-oxygen-concentration retentate product 152, such as nitrogen product, from a feed stream 154 such as air. System 150 includes a first separator 92' which serves as a second stage and a second separator 151 which serves as a first stage. Different purge configurations including reactive gas, diluent gas and/or product purge are utilizable for the second stage as described above regarding FIGS. 1–3. In this construction, the first stage optionally is purged with an oxygen-depleted stream 153. Some fuel may be added to stream 153 to enhance performance and to generate heat to offset heat losses.

Feed stream 154 is compressed by compressor 156 and enters a heat exchanger 158 where the temperature of feed stream 154 is elevated by heat exchange with product stream 152 and oxygen byproduct stream 160 from second separator 151. A trim heater 164 further elevates the feed stream temperature as desired. The heated feed stream is applied to second separator 151, and a second portion of entrained oxygen is driven from the feed zone 166 to the permeate zone 168 via a second SELIC membrane 170, preferably a mixed conducting membrane. The oxygen partial pressure $P_2'$ in the permeate zone optionally is lowered by reducing the back pressure of exit stream 160, purging with an oxygen-depleted gas, such as effluent from the second stage, or by using a vacuum pump (not shown). Pure oxygen or an oxygen-enriched stream is thereby obtained as byproduct stream 160.

Feed stream output 172 is directed to a first feed zone 94' of first separator 92', and a first portion of oxygen, which is contained in the feed stream output 172 from the second feed zone 166, is driven into first permeate zone 96' through first SELIC membrane 98'. Oxygen-depleted nitrogen is obtained as product stream 152.

The first permeate zone 96' is purged with reactive gas stream 112' which includes a desired mixture of diluent steam 114' and product nitrogen diverted through valve 110' as described above for FIG. 3. If available, a suitable external diluent can be used instead of passing product nitrogen through valve 110'. In general, the ratio of purge flow to product flow ranges from 0.05 to 5.

Figure 5:
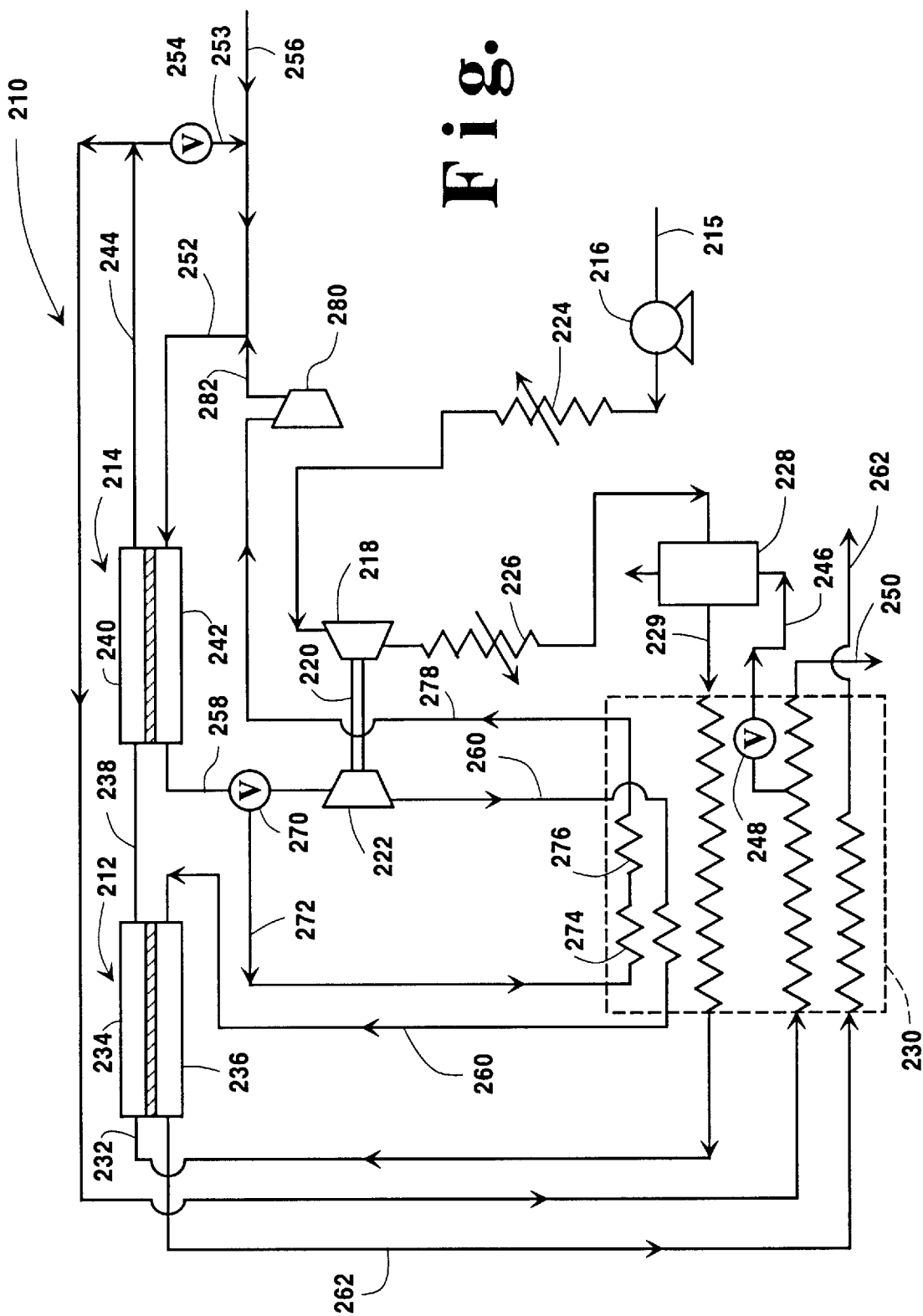
FIG. 5 is a schematic showing of a dual stage system for producing high-purity nitrogen.

A two-stage SELIC membrane system 210 for producing a high-purity product such as nitrogen from a feed stream such as air is shown schematically in FIG. 5. Preferably, both stages utilize mixed conductor SELIC membranes. Air stream 215 is compressed to five to ten bar by an externally powered compressor 216 and/or a compressor 218 which is connected to a shaft 220 driven by an expansion turbine 222. Coolers 224 and 226 lower the temperature of air stream 215 to compensate for heat of compression.

Contaminants such as water and carbon dioxide are removed from compressed air stream 215 in prepurifier 228, such as a thermal or pressure swing adsorption device or a polymeric membrane device. Decontaminated air stream 229 is heated regeneratively in heat exchanger 230 and then introduced as a heated feed stream 232 to feed zone 234 of first SELIC stage 212. In one construction, approximately 30% to 80%, preferably about 40% to about 70%, of elemental oxygen present in feed stream 232 is transferred by an oxygen partial pressure ratio driving force to permeate zone 236 which is at a low total pressure.

Intermediate retentate stream 238 is directed to feed zone 240 of second SELIC stage 214 where substantially all of the remaining elemental oxygen is transferred into reaction zone 242. High-purity nitrogen is withdrawn as product stream 244, which is passed through heat exchanger 230 to become cooled product stream 250. A portion 246, preferably 6% to 9%, of product stream 244 is diverted at an intermediate temperature through throttle 248 to serve as a low pressure regeneration gas in prepurifier 228.

Reactive purge stream 252 enters reaction zone 242 and consumes oxygen to lower the oxygen partial pressure and thereby maintain a high partial pressure ratio even at the high purity product end of second stage 214. Commercial production of nitrogen is achievable even with small-area SELIC membranes.

Approximately 10% to 20% of high-purity product stream 244 is diverted as stream 253 through valve or orifice 254 to dilute pressurized reactive gas stream 256, such as methane. Preferably, reactive purge stream 252 contains enough methane to react with all oxygen within reaction zone 242. In some cases it may be desirable to have a small amount of excess fuel in the second stage 214 to provide some reactive gas in the first stage 212 to supplement its heating needs and to enhance removal of oxygen.

Further, reactive purge stream 252 preferably is maintained at a total pressure close to, more preferably slightly below, the pressure of stream 244. Similar total pressures on the feed and permeate sides within second SELIC stage 214 decrease mechanical stresses in the SELIC membrane and seals, and reduce potential sealing problems encountered during use of different high-temperature materials.

High pressure, low oxygen permeate stream 258 is expanded through turbine 222 to recover power, such as for driving compressor 218. In one construction, turbine 222 is an inexpensive turbocharger that has been modified as disclosed in U.S. Pat. No. 5,460,003 (Nenov), incorporated herein by reference. In another construction, turbine 222 is replaced by a throttling valve, located in stream 260 downstream of heat exchanger 230, to lower the pressure of permeate stream 258 at reduced capital costs.

After expansion, cooled stream 258 becomes low pressure stream 260 which is reheated in heat exchanger 230 and is directed to purge the permeate zone 236 of first SELIC stage 212. Exiting permeate stream 262 is also cooled against decontaminated feed air stream 229 and is then discharged to the atmosphere.

Limiting reactive purging to the second stage 214 reduces fuel consumption and eases thermal management of system 210. System 210 can be designed to have excess heat available from the heat of reaction of the fuel injected into the second stage even with turbine expansion so that no other energy source is required for heating the air and maintaining the system at a desired temperature.

Thermal management is enhanced in this construction by diverting a portion of exhaust stream 258 through valve 270 as a recirculation stream 272. Heat is removed at regions 274, 276 within heat exchanger 230 to warm expanded stream 260 and to externally remove heat from the second stage 214; in another construction region 276 is a separate heat sink. To offset circuit pressure drop, cooler recirculating stream 278 is brought back to second stage purge inlet pressure by a small compressor 280. Cooling of the recirculating stream 272 by regions 274, 276 also enables use of a less expensive compressor 280.

Pressurized recirculation stream 282 is then mixed with reactive gas stream 256 to tailor the temperature and content of reactive purge stream 252. For example, if reactive purge stream 252 contains methane slightly above the stochiometric requirements of permeate zone 242, some residual hydrogen will be present in recirculation stream 282 to ease lighting off the reaction near the purge inlet of permeate zone 242.

EXAMPLE

Production of high purity $N_2$ from a nitrogen feed stream containing 2% oxygen using reactive purge is quantified below in Table I for a single stage SELIC system similar to separator 12, FIG. 1, without the equipment shown in phantom. The process pressure and feed flow were established by a pressurized source of feed nitrogen. The reactive purge stream was also at 1.1 atm pressure and consisted of 40% hydrogen and 60% nitrogen simulating a blending of hydrogen with a portion of the product nitrogen as a diluent purge. The resulting product stream was 99.9999% oxygen-free nitrogen.

TABLE I

| Material | One of the materials of $A_sA'_tB_uB'_vB''_wO_x$ family whose composition is disclosed in U.S. Pat. 5,306,411 (Mazanec et al.) as follows: A represents a lanthanide or Y, or a mixture thereof; A' represents an alkaline earth metal or a mixture thereof; B represents Fe; B' represents Cr or Ti, or a mixture thereof; B" represents Mn, Co, V, Ni or Cu, or a mixture thereof; and s, t, u, v, w, and x are numbers such that: s/t equals from about 0.01 to about 100 |

TABLE I-continued

|  |  |
|---|---|
|  | u equals from about 0.01 to about 1;<br>v equals from zero to about 1;<br>w equals from zero to about 1;<br>x equals a number that satisfies the valences of the A, A', B, B', B" in the formula; and<br>$0.9 < (s + t)/(u + v + w) < 1.1$ |
| SELIC Area | 14 cm$^2$ |
| Thickness | 0.13 cm |
| Process pressure | 1.1 atm |
| Process temp. | 1000° C. |
| Feed flow | 750 sccm of (2% O$_2$ in N$_2$) |
| Purge flow | 250 sccm of (40% H$_2$ in N$_2$) |
| Feed O$_2$ conc. | 2% |
| Product O$_2$ conc. | <1 ppm |

It is shown above that efficient processes and apparatus can be designed to remove oxygen from a gas stream using as membranes solid oxide electrolytes which transport oxygen ions. By employing electrolytes that also have significant electronic conductivity (i.e. mixed conductors), the separation process can be pressure driven, without a need for electrodes and applied electrical voltages. The use of reactive purging, with or without vacuum pumping, on the permeate side greatly increases the capability and efficiency of the pressure-driven process Reactive purging can also permit an ionic conductor with electrodes and an external circuit to be used for high-purity retentate production. In such a scheme, power can be produced in that stage as a co-product.

Significant improvements in operation may be achieved by conducting the purification process in two or more stages with the successive stages operating at lower partial pressures of oxygen on both the feed and permeate sides. Progressively lower oxygen partial pressures on the permeate side can be created by purging with gas streams containing progressively lower oxygen concentrations and/or progressively higher quantities or qualities of reactive gas as described above, and/or by vacuum pumping to progressively lower pressures.

For producing high-purity nitrogen from air, for example, the first stage preferably removes about 30% to about 80% of oxygen contained in the feed stream, and more preferably removes about 40% to about 70% of the oxygen. The reactive purge stream preferably is at a lower pressure than that of the feed stream, and more preferably is at a slightly lower pressure to facilitate sealing and to reduce mechanical stresses. The SELIC membrane or membranes in the first stage are selected to achieve high oxygen conductivity at relatively high oxygen partial pressures and the SELIC membrane or membranes in the second stage are selected for stability at relatively low oxygen partial pressure.

By combining an initial mixed conductor SELIC stage with a subsequent ionic-only conductor SELIC stage, the mixed conductor stage removes the bulk of the oxygen whereas the ionic conductor stage removes the last traces of oxygen to produce a high purity oxygen-free product such as nitrogen or argon.

While diluent streams such as exhaust recirculation stream 282 and product purge stream 253, FIG. 5, have been described as preferably being mixed together with the reactive gas stream prior to applying the combined purge stream through a single inlet to the permeate zone, one or more diluent streams may be introduced through separate inlets in other constructions according to the present invention. The diluent streams can be mixed with the reactive gas during or after introduction of the reactive gas into the permeate zone.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for producing a high-purity product from a feed stream containing elemental oxygen, comprising:

applying said feed stream to a first separator including a first feed zone and a first permeate zone separated by a first solid electrolyte membrane capable of transporting oxygen ions;

driving a first portion of oxygen contained in said feed stream from said first feed zone to said first permeate zone through said first membrane by applying a reactive purge stream to said first permeate zone, said reactive purge stream including a reactive gas that consumes oxygen to establish a lower partial pressure of oxygen in said first permeate zone; and obtaining an oxygen-depleted product stream after the first portion of oxygen has been driven from said first feed zone.

2. The process of claim 1 wherein said reactive purge stream includes an oxygen-depleted diluent component.

3. The process of claim 1 wherein said reactive purge stream includes a portion of output from said first feed zone.

4. The process of claim 1 further including directing at least a portion of output from said first permeate zone to mix with said reactive purge stream.

5. The process of claim 1 further including positioning said first separator as a second stage and initially applying said feed stream to a second feed zone of at least a second separator, said second separator being positioned as a first stage and having a second permeate zone separated from said second feed zone by a second solid electrolyte membrane;

driving a second portion of oxygen, which is contained in said feed stream, from said second feed zone to said second permeate zone through said second membrane; and directing an oxygen-depleted feed stream, obtained after the second portion of oxygen has been driven from said second feed zone, to said first feed zone of said first separator.

6. The process of claim 5 wherein said reactive purge stream applied to said first permeate zone includes an oxygen-depleted diluent component that is selected to accomplish at least one of decreasing the rate at which said reactive gas combines with the oxygen, controlling temperature rise in said first separator, and rendering chemical conditions with said first permeate zone less reducing.

7. The process of claim 6 wherein the step of driving oxygen for at least one of said first and second separators includes diverting a portion of output from at least one of said first and second feed zones to purge the permeate zone of that separator.

8. The process of claim 7 wherein at least one of said first and second membranes includes a mixed conduction material.

9. The process of claim 8 wherein said first membrane in said second stage is an ionic membrane, and the step of driving for said first separator includes providing an electrical connection across said first membrane.

10. The process of claim 5 further including directing a purge stream from an outlet of said first permeate zone to an inlet of said second permeate zone.

11. The process of claim 5 wherein the feed stream is air and the high-purity product is nitrogen, and wherein the first stage removes about 30% to about 80% of the oxygen contained in the feed stream.

12. The process of claim 5 wherein the reactive purge stream is applied to said first permeate zone at a lower pressure than that at which said feed stream is applied to said first separator.

13. The process of claim 12 wherein at least a first portion of output from said first permeate zone is expanded in a turbine or is throttled to a lower pressure.

14. The process of claim 13 wherein the expanded or throttled output from said first permeate zone is directed to an inlet of said second permeate zone.

15. The process of claim 14 further including directing at least a second portion of output from said first permeate zone, prior to expanding or throttling the first portion of output, to mix with said reactive purge stream prior to applying said reactive purge stream into said first permeate zone.

16. The process of claim 5 wherein said second membrane in the first stage is selected to achieve high oxygen conductivity at relatively high oxygen partial pressures and said first membrane in the second stage is selected for stability at relatively low oxygen partial pressure.

17. The process of claim 5 wherein the high-purity product obtained from said first feed zone is nitrogen, and oxygen is obtained as a co-product from said second permeate zone.

18. The process of claim 5 further including utilizing at least a portion of output from said first permeate zone to add heat to or to reject heat from said first separator.

19. A process for producing a high-purity product from a feed stream containing elemental oxygen, comprising:

initially applying said feed stream to a second feed zone of at least a second separator, said second separator being provided with a second permeate zone separated from said second feed zone by a second solid electrolyte membrane capable of transporting oxygen ions;

driving a second portion of oxygen, which is contained in said feed stream, from said second feed zone to said second permeate zone through said second membrane;

directing an oxygen-depleted feed stream, obtained after the second portion of oxygen has been driven from said second feed zone, to a first feed zone of a first separator, said first separator including said first feed zone and a first permeate zone separated by a first solid electrolyte membrane capable of transporting oxygen ions;

driving a remaining first portion of oxygen contained in said feed stream from said first feed zone to said first permeate zone through said first membrane by applying a reactive purge stream to said first permeate zone, said reactive purge stream including a reactive gas that consumes oxygen and an oxygen-depleted diluent component; and obtaining a high-purity product stream after the remaining first portion of oxygen has been driven from said first feed zone.

20. The process of claim 19 wherein said reactive purge stream includes steam as said oxygen-depleted diluent component.

* * * * *